United States Patent
Hong

(10) Patent No.: US 11,553,536 B2
(45) Date of Patent: Jan. 10, 2023

(54) CHANNEL COORDINATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 14 days.

(21) Appl. No.: 16/770,000

(22) PCT Filed: Dec. 7, 2017

(86) PCT No.: PCT/CN2017/115045
§ 371 (c)(1),
(2) Date: Jun. 4, 2020

(87) PCT Pub. No.: WO2019/109311
PCT Pub. Date: Jun. 13, 2019

(65) Prior Publication Data
US 2021/0204333 A1    Jul. 1, 2021

(51) Int. Cl.
*H04W 74/08* (2009.01)
*H04W 28/02* (2009.01)
*H04W 72/08* (2009.01)

(52) U.S. Cl.
CPC ... *H04W 74/0841* (2013.01); *H04W 28/0294* (2013.01); *H04W 72/082* (2013.01); *H04W 72/085* (2013.01)

(58) Field of Classification Search
CPC ......... H04W 74/0841; H04W 28/0294; H04W 72/082; H04W 72/085; H04W 72/0426; H04W 88/08
See application file for complete search history.

(56) References Cited

U.S. PATENT DOCUMENTS 9,351,306 B2    5/2016 Shen et al.
2008/0075094 A1 3/2008 Ahn et al.
(Continued)

FOREIGN PATENT DOCUMENTS

CN    102300320 A    12/2011
CN    102480738 A    5/2012
(Continued)

OTHER PUBLICATIONS

International Search Report issued in PCT/CN2017/115045, dated Aug. 15, 2018, (4p).

(Continued)

*Primary Examiner* — Ivan O Latorre
(74) *Attorney, Agent, or Firm* — Arch & Lake LLP

(57) ABSTRACT

Provided are a channel coordination method and apparatus. The method may be used by a first access point (AP) that is currently serving a terminal. In response to determining that a channel needs to be configured for a real-time service initiated by the terminal, the first AP detects a second AP that requires channel coordination. The first AP sends channel coordination request signalling to the second AP, wherein the channel coordination request signalling comprises a designated channel that the first AP requests to coordinate. In response to receiving first channel coordination feedback signalling, which is used for indicating to agree to coordinate the designated channel, sent from the second AP, the first AP determines, according to the first channel coordination feedback signalling, that the second AP agrees to coordinate the designated channel.

9 Claims, 13 Drawing Sheets

(56) References Cited

U.S. PATENT DOCUMENTS

| | | | |
|---|---|---|---|
| 2010/0185749 A1 | 7/2010 | Sawai | |
| 2012/0178467 A1* | 7/2012 | Fujii | H04W 72/0406 455/452.1 |
| 2012/0213208 A1 | 8/2012 | Hsu et al. | |
| 2013/0084907 A1* | 4/2013 | Shen | H04W 72/1226 455/501 |
| 2013/0163531 A1* | 6/2013 | Kim | H04W 88/08 370/329 |
| 2013/0223272 A1* | 8/2013 | Tao | H04B 7/024 370/252 |
| 2015/0173086 A1* | 6/2015 | Karaman | H04W 16/10 370/254 |
| 2018/0189131 A1* | 7/2018 | Endo | G06F 11/184 |
| 2018/0255482 A1* | 9/2018 | Song | H04W 28/16 |
| 2021/0320790 A1* | 10/2021 | Nishimura | H04L 9/3263 |
| 2022/0046627 A1* | 2/2022 | Hosseini | H04W 72/1263 |

FOREIGN PATENT DOCUMENTS

| | | |
|---|---|---|
| CN | 102907135 A | 1/2013 |
| CN | 103327498 A | 9/2013 |
| CN | 104994585 A | 10/2015 |
| CN | 107086934 A | 8/2017 |

OTHER PUBLICATIONS

First Office Action issued to Chinese Application No. 201780002118.X dated Nov. 3, 2020 with English translation, (26p).

* cited by examiner

CHANNEL COORDINATION METHOD AND APPARATUS

CROSS-REFERENCE TO RELATED APPLICATION

This application is a national phase of International Application No. PCT/CN2017/115045, filed on Dec. 7, 2017, the entire contents of which are hereby incorporated by reference as a part of the present application for all purposes.

TECHNICAL FIELD

The present disclosure relates to the field of communication technologies, and in particular, to a channel coordination method and apparatus.

BACKGROUND

With continuous development of communication technologies, intelligent terminals have also been widely used. In the new generation communication system, real-time services of the terminal will develop faster and will be more diverse, and raise higher requirements for the stability of the 802.11 wireless network. However, the existing 802.11 wireless network has much interference, and there is still no better technical solution to reduce the interference of the 802.11 wireless network.

SUMMARY

In order to overcome the problems in the related art, embodiments of the present disclosure provide a channel coordination method and apparatus.

According to a first aspect of the present disclosure, a channel coordination method is provided, the method is used for a first access point AP, the first AP is an AP currently serving a terminal, and the method may include:

in response to determining that a channel needs to be configured for a real-time service initiated by the terminal, detecting a second AP that requires channel coordination;

sending a channel coordination request signaling to the second AP, wherein the channel coordination request signaling includes a designated channel that the first AP requests to coordinate; and in response to receiving a first channel coordination feedback signaling sent from the second AP for indicating to agree to coordinate the designated channel, determining, according to the first channel coordination feedback signaling, that the second AP agrees to coordinate the designated channel.

According to a second aspect of the present disclosure, a channel coordination method is provided. The method is used for a second AP, a first AP is an AP currently serving a terminal, and the second AP is an AP detected by the first AP and requiring the channel coordination. The method includes:

receiving a channel coordination request signaling sent by the first AP, wherein the channel coordination request signaling includes a designated channel that the first AP requests to coordinate;

in response to determining to agree to coordinate the designated channel, sending a first channel coordination feedback signaling for indicating to agree to coordinate the designated channel to the first AP; and determining a channel for local service transmission according to the designated channel.

According to a third aspect of the present disclosure, a channel coordination method is provided. The method is used for a terminal, and the first AP is an AP currently serving the terminal. The method includes:

in response to initiating a real-time service, determining a service type used to characterize the real-time service; and sending the service type to the first AP, so that the first AP determines that a channel needs to be configured for the real-time service initiated by the terminal according to the service type, and detects a second AP that requires channel coordination.

According to a fourth aspect of the present disclosure, a channel coordination apparatus is provided. The apparatus is used for a first AP. The first AP is an AP currently serving a terminal. The apparatus includes:

a detection module, configured to detect a second AP that requires channel coordination when it is determined that a channel needs to be configured for a real-time service initiated by the terminal;

a first sending module, configured to send a channel coordination request signaling to the second AP, wherein the channel coordination request signaling includes a designated channel that the first AP requests to coordinate; and a first determining module, configured to: when a first channel coordination feedback signaling sent from the second AP for indicating to agree to coordinate the designated channel is received, determine, according to the first channel coordination feedback signaling, that the second AP agrees to coordinate the designated channel.

According to a fifth aspect of the present disclosure, a channel coordination apparatus is provided, the apparatus is used for a second AP, the first AP is an AP currently serving a terminal, and the second AP is an AP detected by the first AP and requiring the channel coordination. The apparatus includes:

a first signaling receiving module, configured to receive a channel coordination request signaling sent by the first AP, wherein the channel coordination request signaling includes a designated channel that the first AP requests to coordinate;

a first signaling sending module, configured to, when determining to agree to coordinate the designated channel, send a first channel coordination feedback signaling, which is used for indicating to agree to coordinate the designated channel to the first AP; and a channel determining module, configured to determine a channel for local service transmission according to the designated channel.

According to a sixth aspect of the present disclosure, a channel coordination apparatus is provided. The apparatus is used for a terminal, and the first AP is an AP currently serving the terminal. The apparatus includes:

a service type determining module, configured to determine a service type used to characterize the real-time service when a real-time service is initiated; and a service type sending module, configured to send the service type to the first AP, so that the first AP determines that a channel needs to be configured for the real-time service initiated by the terminal according to the service type, and detects a second AP that requires channel coordination.

According to a seventh aspect of the present disclosure, a non-transitory computer-readable storage medium having a computer program stored thereon is provided, wherein the computer program is used to perform the channel coordination method described in the first aspect.

According to an eighth aspect of the present disclosure, a non-transitory computer-readable storage medium having a computer program stored thereon is provided, wherein the computer program is used to perform the channel coordination method described in the second aspect.

According to a ninth aspect of the present disclosure, a non-transitory computer-readable storage medium having a computer program stored thereon is provided, wherein the computer program is used to perform the channel coordination method described in the third aspect.

According to a tenth aspect of the present disclosure, a channel coordination apparatus is provided. The apparatus is used for a first AP, and the first AP is an AP currently serving a terminal. The apparatus includes:

a processor; and a memory for storing executable instructions of the processor;

wherein the processor is configured to:

in response to determining that a channel needs to be configured for a real-time service initiated by the terminal, detect a second AP that requires channel coordination;

send a channel coordination request signaling to the second AP, wherein the channel coordination request signaling includes a designated channel that the first AP requests to coordinate; and in response to receiving a first channel coordination feedback signaling sent from the second AP for indicating to agree to coordinate the designated channel, determine, according to the first channel coordination feedback signaling, that the second AP agrees to coordinate the designated channel.

According to an eleventh aspect of the present disclosure, a channel coordination apparatus is provided, the apparatus is used for a second AP, a first AP is an AP currently serving a terminal, and the second AP is an AP detected by the first AP and requiring the channel coordination. The apparatus includes:

a processor; and a memory for storing executable instructions of the processor;

wherein the processor is configured to:

receive a channel coordination request signaling sent by the first AP, wherein the channel coordination request signaling includes a designated channel that the first AP requests to coordinate;

in response to determining to agree to coordinate the designated channel, send a first channel coordination feedback signaling, which is used for indicating to agree to coordinate the designated channel to the first AP; and determine a channel for local service transmission according to the designated channel.

According to a twelfth aspect of the present disclosure, a channel coordination apparatus is provided, the apparatus is used for a terminal, and the first AP is an AP currently serving the terminal, and the apparatus includes:

a processor; and a memory for storing executable instructions of the processor;

wherein the processor is configured to:

when a real-time service is initiated, determine a service type used to characterize the real-time service; and send the service type to the first AP, so that the first AP determines that a channel needs to be configured for the real-time service initiated by the terminal according to the service type, and detects a second AP that requires channel coordination.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. The same numeral in different figures denotes to the same or similar elements in the following description, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Figure 1:
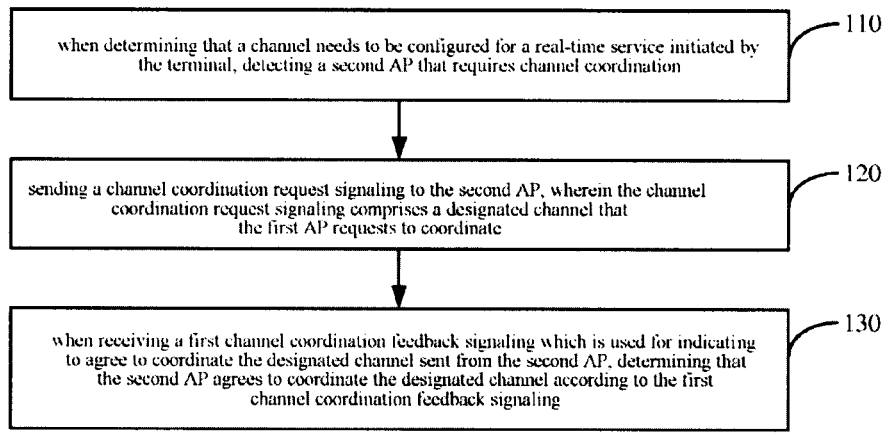
FIG. 1 is a flowchart showing a channel coordination method according to an exemplary embodiment.
Figure 2:
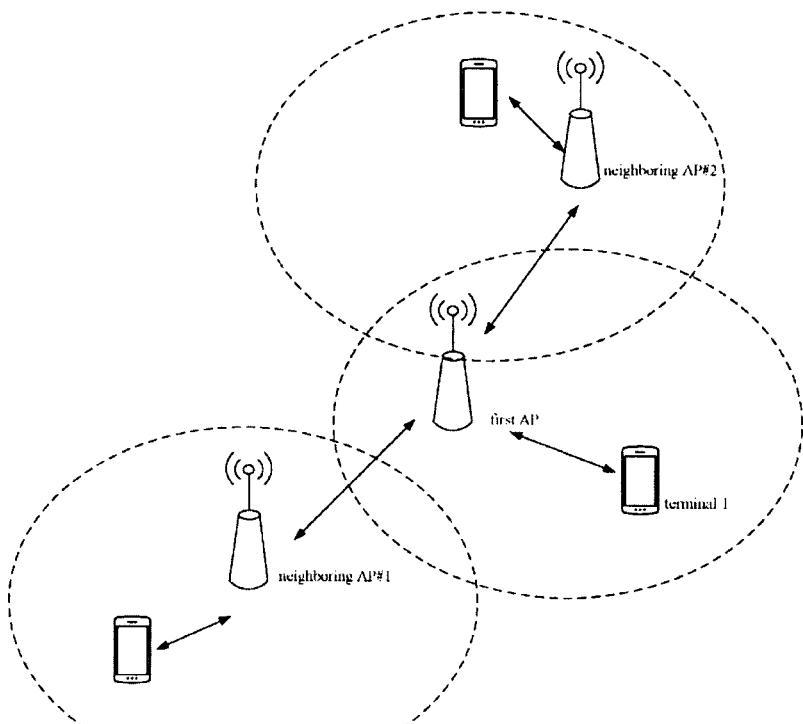
FIG. 2 is a scene diagram showing a channel coordination method according to an exemplary embodiment.

FIG. 1 is a flowchart showing a channel coordination method according to an exemplary embodiment; and FIG. 2 is a scene diagram showing a channel coordination method according to an exemplary embodiment. The channel coordination method can be used for a first AP (Access Point). The first AP is an AP currently serving a terminal. As shown in FIG. 1, the channel coordination method includes following steps 110-130.

In step 110, in response to determining that a channel needs to be configured for a real-time service initiated by the terminal, a second AP that requires channel coordination is detected.

In the embodiment of the present disclosure, the second AP may refer to an AP that has strong interference to the first AP. When the first AP determines that a channel needs to be configured for the real-time service initiated by the terminal, in order to ensure communication quality of the configured channel, the channel coordination with the second AP is required.

The first AP may detect one second AP, a plurality of APs, no second AP, among the neighboring APs around.

When the first AP does not detect the second AP among the neighboring APs around, it is indicated that there is no AP having strong interference to the first AP around the first AP. At this time, the channel can be directly configured for the real-time service initiated by the terminal.

In step 120, a channel coordination request signaling is sent to the second AP, and the channel coordination request signaling includes a designated channel that the first AP requests to coordinate.

In the embodiment of the present disclosure, when the first AP detects the second AP among the neighboring APs around, the second AP can be notified of the designated channel requested for coordination through the channel coordination request signaling.

In step 130, in response to receiving a first channel coordination feedback signaling sent from the second AP for indicating to agree to coordinate the designated channel, the first AP determines that the second AP agrees to coordinate the designated channel according to the first channel coordination feedback signaling.

In an embodiment scenario, as shown in FIG. 2, the first AP is an AP currently serving the terminal 1, and both neighboring AP #1 and neighboring AP #2 are neighboring APs of the first AP. When the first AP determines that the channel needs to be configured for the real-time service initiated by the terminal:

when it is detected that the interference of neighboring AP #1 is stronger and the interference of neighboring AP #2 is weaker, it can be determined that the neighboring AP #1 is the second AP that needs channel coordination, and the channel coordination request signaling is sent to neighboring AP #1. The channel coordination request signaling includes the designated channel that the first AP requests to coordinate. When the first channel coordination feedback signaling sent from neighboring AP #1 and used for indicating to agree to coordinate the designated channel is received, it is determined that neighboring AP #1 agrees to coordinate the designated channel.

It can be seen from the above embodiment that, when it is detected the second AP that requires channel coordination, the channel coordination request signaling may be sent to the second AP, and the channel coordination request signaling includes the designated channel that the first AP requests to coordinate. When the first channel coordination feedback signaling sent from the second AP for indicating to agree to coordinate the designated channel is received, it is determined that the second AP agrees to coordinate the designated channel according to the first channel coordination feedback signaling, which facilitates that the first AP performs configuration for the terminal according to a channel that has been coordinated with a second AP, thereby reducing interference of the wireless network through channel coordination between different APs, and also improving the stability of the channel configured for the terminal.

In an embodiment, the designated channel in the above step 120 may include a channel that the first AP intends to operate.

It can be seen from the above embodiment that the designated channel that the first AP requests to coordinate may be the channel that the first AP intends to operate, thereby realizing the coordination for the channel that the first AP intends to operate, enriching the content of channel coordination, and further improving channel coordination efficiency.

In an embodiment, the designated channel in the above step 120 may include a channel that the first AP does not intend to operate.

It can be seen from the above embodiment that the designated channel that the first AP requests to coordinate may be the channel that the first AP does not intend to operate, thereby realizing the coordination for the channel that the first AP does not intend to operate, enriching the content of channel coordination, and further improving channel coordination efficiency.

In an embodiment, the channel coordination request signaling in step 120 above also includes a service type that the first AP needs to support, and the service type is used to characterize the real-time service initiated by the terminal.

It can be seen from the above embodiment that the channel coordination request signaling sent by the first AP further includes the service type that the first AP needs to support, and the service type is used to characterize the real-time service initiated by the terminal, so that the second AP can timely determine the service type that the first AP needs to support, and can determine whether to agree to coordinate the designated channel that the first AP requests to coordinate according to the service type, thereby improving the accuracy of the channel coordination.

Figure 3:
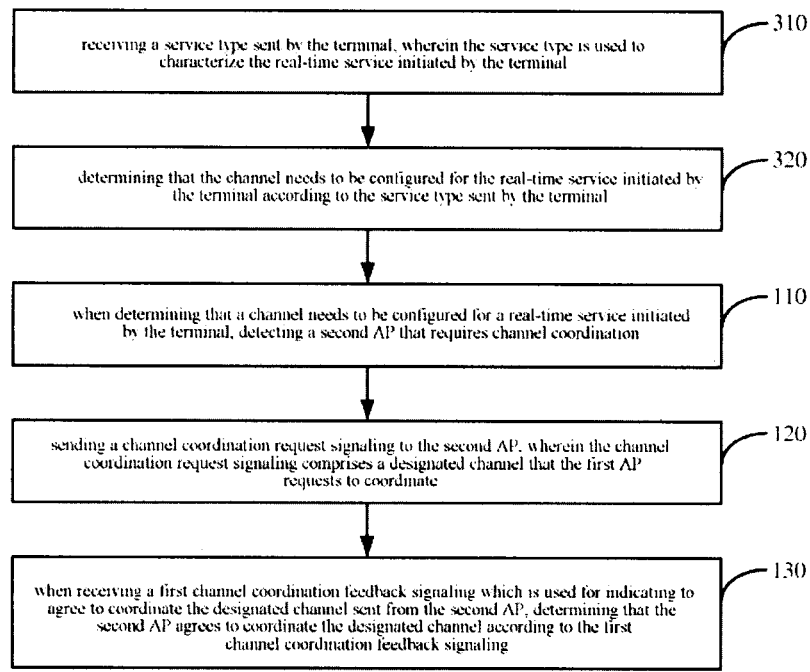
FIG. 3 is a flowchart showing another channel coordination method according to an exemplary embodiment.

FIG. 3 is a flowchart showing another channel coordination method according to an exemplary embodiment. The channel coordination method may be used for the first AP and is based on the method shown in FIG. 1. As shown in FIG. 3, the channel coordination method further includes following steps 310-320.

In step 310, the service type sent by the terminal is received, and the service type is used to characterize the real-time service initiated by the terminal.

In the embodiments of the present disclosure, when the terminal initiates a real-time service, it needs to first indicate its service type to the first AP; after receiving the service type sent by the terminal, the first AP will determine that the channel needs to be configured for the real-time service initiated by the terminal, and detect whether there is a second AP that needs channel coordination among the neighboring APs around.

In step 320, it is determined that a channel needs to be configured for a real-time service initiated by the terminal according to the service type sent by the terminal.

It can be seen from the above embodiment that when the service type sent by the terminal is received, wherein the service type is used to characterize the real-time service initiated by the terminal, it can be determined that a channel needs to be configured for a real-time service initiated by the terminal according to the service type sent by the terminal and the second AP that requires channel coordination is detected, thereby better supporting the real-time service initiated by the terminal, and also improving the practicality of channel coordination.

Figure 4:
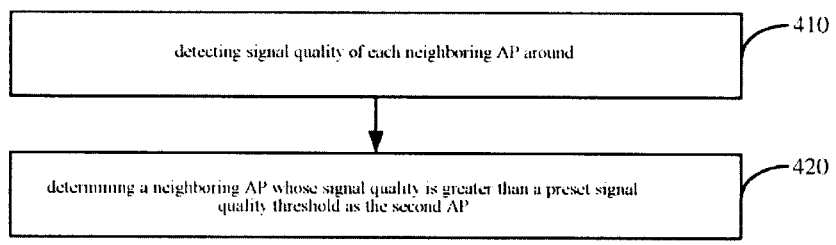
FIG. 4 is a flowchart showing another channel coordination method according to an exemplary embodiment.

FIG. 4 is a flowchart showing another channel coordination method according to an exemplary embodiment. The channel coordination method may be used for the first AP and is based on the method shown in FIG. 1. As shown in FIG. 4, when the step 110 is performed, the following steps 410-420 may be included.

In step 410, signal quality of each neighboring AP around is detected.

In the embodiment of the present disclosure, the signal quality of the neighboring AP may refer to the strength of the signal sent by the neighboring AP.

In step 420, the neighboring AP with signal quality greater than a preset signal quality threshold is determined as the second AP.

In the embodiment of the present disclosure, the neighboring AP with the signal quality greater than the preset signal quality threshold may indicate that the neighboring AP has strong interference to the first AP, and the neighboring AP can be determined the second AP requiring channel coordination.

The preset signal quality threshold may be a fixed threshold set according to actual conditions, or may be a different threshold set for different service types, or may also be a different threshold set for different times for the terminal to initiate real-time services.

It can be seen from the above embodiment that by detecting the signal quality of each neighboring AP around, the neighboring AP with signal quality greater than the preset signal quality threshold is determined as the second AP, thereby improving the reliability of determining the second AP.

Figure 5:
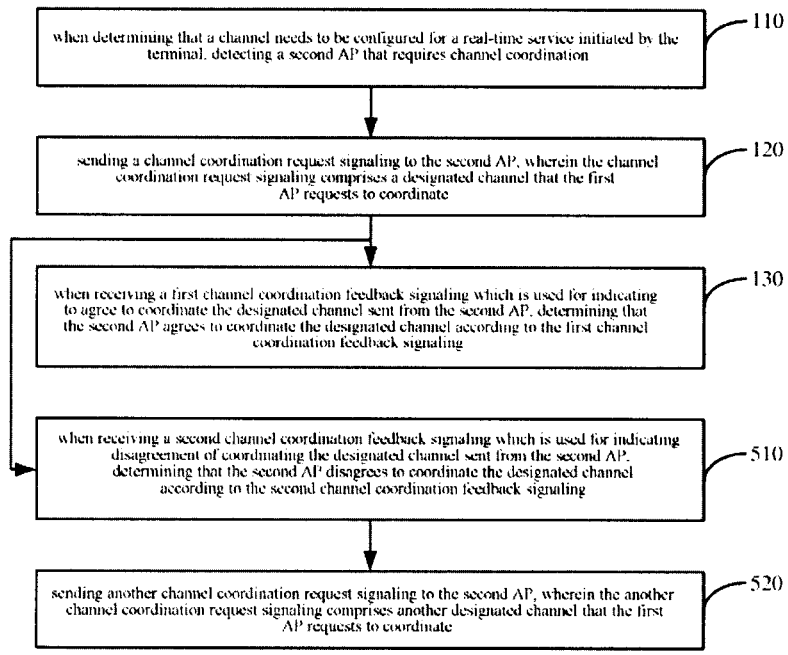
FIG. 5 is a flowchart showing another channel coordination method according to an exemplary embodiment.

FIG. 5 is a flowchart showing another channel coordination method according to an exemplary embodiment. The channel coordination method may be used for the first AP and is based on the method shown in FIG. 1. The channel coordination method also includes following steps 510-520.

In step 510, when a second channel coordination feedback signaling sent from the second AP for indicating to disagree to coordinate the designated channel is received, it is determined that the second AP disagrees to coordinate the designated channel according to the second channel coordination feedback signaling.

In the embodiment of the present disclosure, the second channel coordination feedback signaling is used to indicate to disagree to coordinate the designated channel.

In step 520, another channel coordination request signaling is sent to the second AP, and the another channel coordination request signaling includes another designated channel that the first AP requests to coordinate.

In the embodiment of the present disclosure, the first AP sends another channel coordination request signaling to the second AP, in order to continue performing the channel coordination with the second AP. When receiving the second channel coordination feedback signaling sent from the second AP for indicating to disagree to coordinate the another designated channel, the first AP may also send still another channel coordination request signaling to the second AP until the second AP agrees to coordinate the designated channel, and the still other channel coordination request signaling includes still another designated channel that the first AP requests to coordinate.

In addition, a threshold for the number of times of channel coordination may also be preset, for example: 5 times. When the number of times of channel coordination exceeds the threshold of the number of times of channel coordination, the coordination can be stopped.

It can be seen from the above embodiment that when a second channel coordination feedback signaling sent from the second AP for indicating to disagree to coordinate the designated channel is received, it is determined that the second AP disagrees to coordinate the designated channel according to the second channel coordination feedback signaling. Further, the first AP may continue to send another channel coordination request signaling to the second AP, and the another channel coordination request signaling includes another designated channel that the first AP requests to coordinate, thereby reducing the wireless network interference through multiple channel coordination of different APs.

Figure 6:
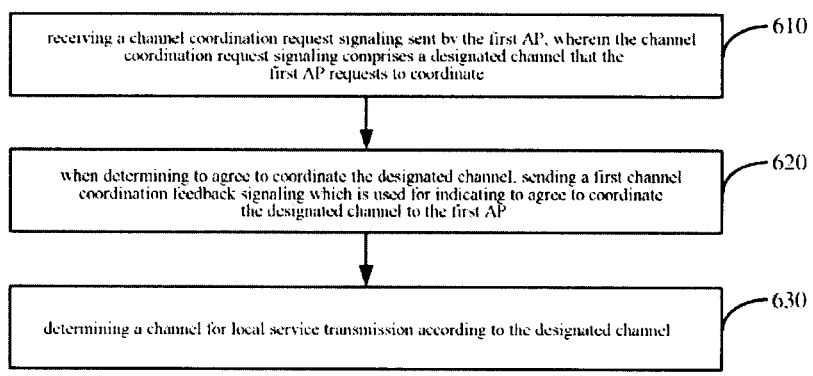
FIG. 6 is a flowchart showing a channel coordination method according to an exemplary embodiment.

FIG. 6 is a flowchart showing a channel coordination method according to an exemplary embodiment. The channel coordination method may be used for a second AP, and a first AP is an AP currently serving a terminal, and the second AP is an AP detected by the first AP and requiring the channel coordination. As shown in FIG. 6, the channel coordination method includes the following steps 610-630.

In step 610, a channel coordination request signaling sent by the first AP is received, and the channel coordination request signaling includes a designated channel that the first AP requests to coordinate.

In the embodiment of the present disclosure, the second AP may refer to an AP that has strong interference to the first AP. When the first AP needs to perform channel coordination with the second AP, the second AP may obtain the designated channel that the first AP requests to coordinate from the channel coordination request signaling of the first AP.

The second AP may or may not agree to coordinate the designated channel. If the second AP agrees, the second AP may send the first channel coordination feedback signaling indicating to agree to coordinate the designated channel to the first AP; if the second AP disagrees, the second AP may send the second channel coordination feedback signaling indicating to disagree to coordinate the designated channel to the first AP.

The designated channel that the first AP requests to coordinate may be a channel that the first AP intends to operate, and also may be a channel that the first AP does not intend to operate.

In step 620, when it is determined to agree to coordinate the designated channel, a first channel coordination feedback signaling is sent to the first AP, which is used for indicating to agree to coordinate the designated channel.

In step 630, a channel for local service transmission is determined according to the designated channel.

In the embodiment of the present disclosure, when the coordination is agreed, in order to ensure the communication quality of the channel configured by the first AP for the terminal, and to avoid conflict with the channel configured by the first AP for the terminal, it is necessary to determine the channel for the local service transmission according to the designated channel.

It can be seen from the above embodiment that by receiving the channel coordination request signaling including a designated channel that the first AP requests to coordinate sent by the first AP, the first channel coordination feedback signaling for indicating to agree to coordinate the designated channel is sent to the first AP, when it is determined to agree to coordinate the designated channel; and a channel for local service transmission is determined according to the designated channel, thereby reducing interference of the wireless network through channel coordination between different APs, and also avoiding conflict with the channel configured by the first AP for the terminal, so that the first AP can better provide the wireless service for the terminal.

Figure 7:
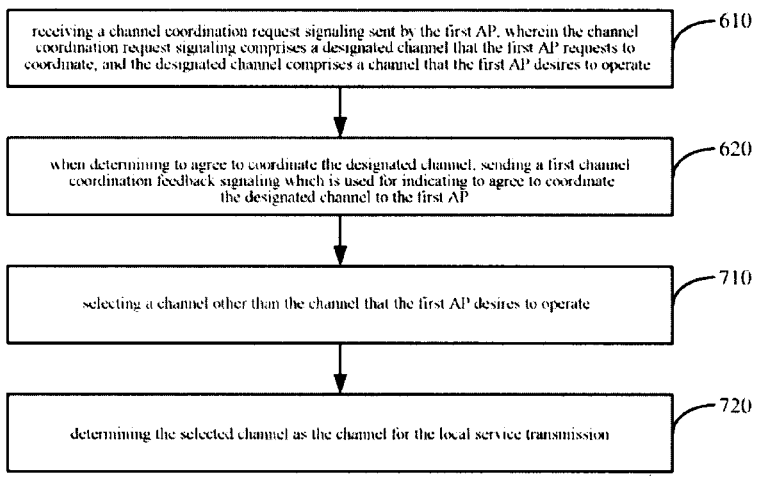
FIG. 7 is a flowchart showing another channel coordination method according to an exemplary embodiment.

FIG. 7 is a flowchart showing another channel coordination method according to an exemplary embodiment. The channel coordination method may be used for the second AP and is based on the method shown in FIG. 6. The designated channel in step 610 above includes the channel that the first AP intends to operate. When the step 630 is executed, as shown in FIG. 7, the following steps 710-720 may be included.

In step 710, a channel other than the channel that the first AP intends to operate is selected.

In step 720, the selected channel is determined as the channel for the local service transmission.

It can be seen from the above embodiment that when the designated channel that the first AP requests to coordinate is the channel that the first AP intends to operate, a channel other than the channel that the first AP intends to operate is selected, and the selected channel is determined as the channel for the local service transmission, thereby avoiding the collision of the channel that the first AP intends to operate, and reducing the network interference between different APs.

Figure 8:
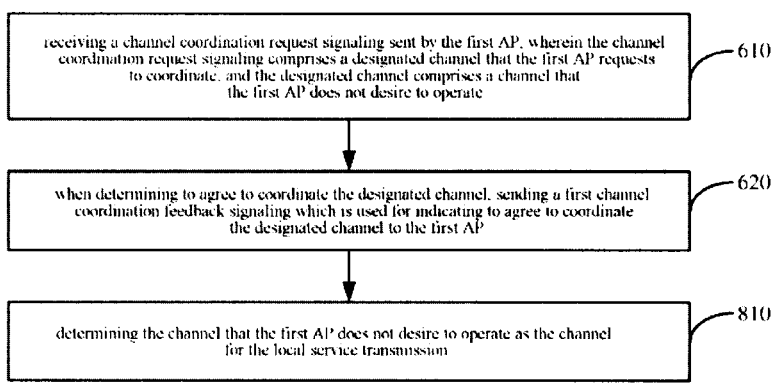
FIG. 8 is a flowchart showing another channel coordination method according to an exemplary embodiment.

FIG. 8 is a flowchart showing another channel coordination method according to an exemplary embodiment. The channel coordination method may be used for a second AP and is based on the method shown in FIG. 6. The designated channel in step 610 above includes the channel that the first AP does not intend to operate. When the step 630 is executed, as shown in FIG. 8, the following step 810 may be included.

In step 810, the channel that the first AP does not intend to operate is determined as the channel for the local service transmission.

It can be seen from the above embodiment that when the designated channel that the first AP requests to coordinate is the channel that the first AP does not intend to operate, the channel that the first AP does not intend to operate is determined as the channel for the local service transmission, thereby avoiding the collision of the channel that the first AP intends to operate, and reducing the network interference between different APs.

Figure 9:
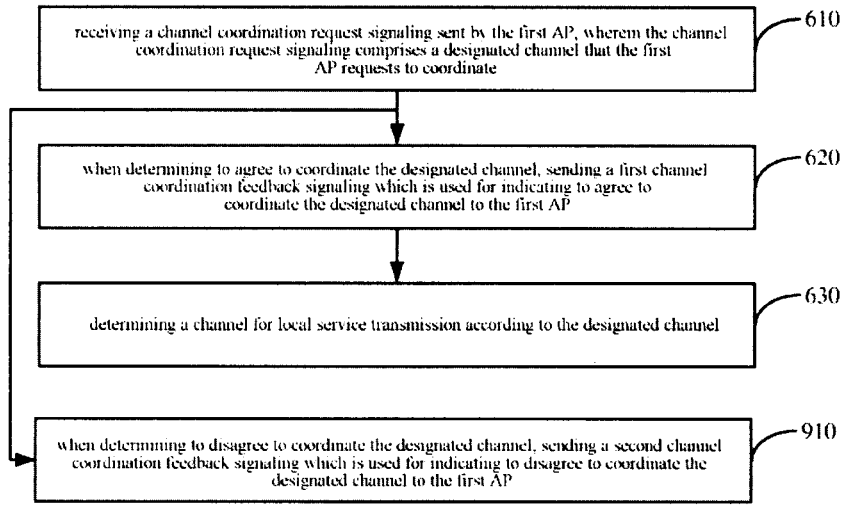
FIG. 9 is a flowchart showing another channel coordination method according to an exemplary embodiment.

FIG. 9 is a flowchart showing another channel coordination method according to an exemplary embodiment. The channel coordination method may be used for a second AP and is based on the method shown in FIG. 6. As shown in FIG. 9, the channel coordination method further includes the following step 910.

In step 910, when it is determined to disagree to coordinate the designated channel, a second channel coordination feedback signaling for indicating to disagree to coordinate the designated channel is sent to the first AP.

It can be seen from the above embodiment that when it is determined to disagree to coordinate the designated channel, the second channel coordination feedback signaling for indicating to disagree to coordinate the designated channel can be sent to the first AP, thereby satisfying the autonomous choice for channel coordination of the second AP, and improving the channel coordination efficiency.

Figure 10:
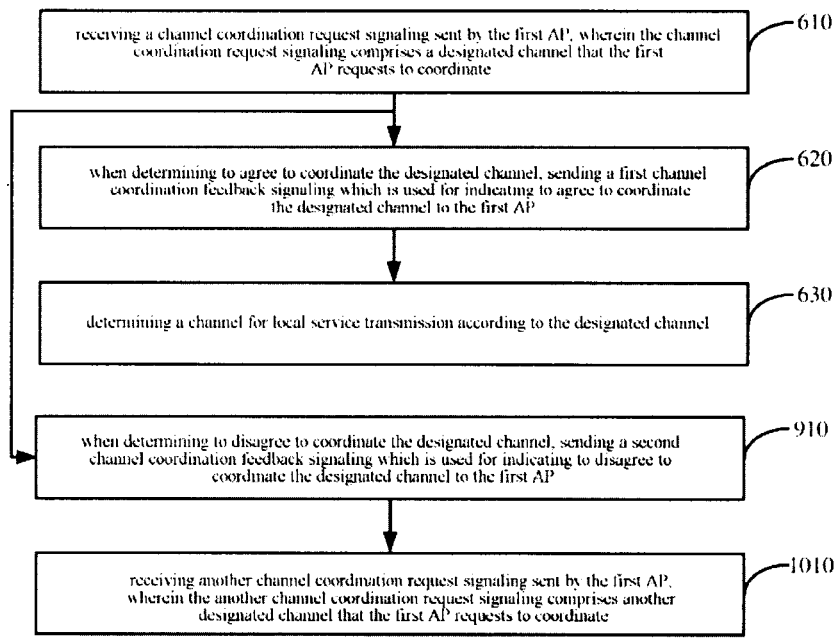
FIG. 10 is a flowchart showing another channel coordination method according to an exemplary embodiment.

FIG. 10 is a flowchart showing another channel coordination method according to an exemplary embodiment. The channel coordination method may be used for the second AP and is based on the method shown in FIG. 9. As shown in FIG. 10, the channel coordination method further includes the following step 1010.

In step 1010, another channel coordination request signaling sent by the first AP is received, and the another channel coordination request signaling includes another designated channel that the first AP requests to coordinate.

In the embodiment of the present disclosure, after the second AP receives another channel coordination request signaling sent by the first AP, the second AP may agree to coordinate another designated channel or may disagree to coordinate another coordinated designated channel. If the second AP agrees, the second AP can send the channel coordination feedback signaling to the first AP indicating to agree to coordinate another designated channel; if the second AP disagrees, the second AP can send the channel coordination feedback signaling to the first AP indicating to disagree to coordinate another designated channel.

It can be seen from the above embodiment that by receiving another channel coordination request signaling sent by the first AP, which includes another designated channel that the first AP requests to coordinate, it achieves reducing wireless network interference through multiple channel coordination of different APs.

Figure 11:
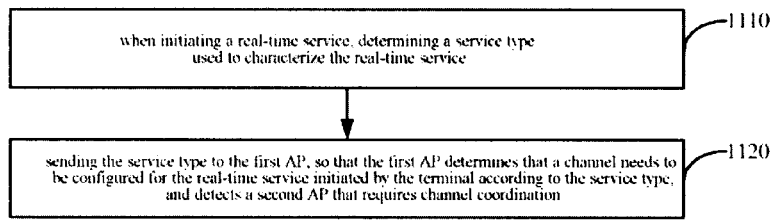
FIG. 11 is a flowchart showing a channel coordination method according to an exemplary embodiment.

FIG. 11 is a flowchart showing a channel coordination method according to an exemplary embodiment. The channel coordination method may be used for a terminal, and the first AP is an AP currently serving the terminal. As shown in FIG. 11, the channel coordination method includes the following steps 1110-1120.

In step 1110, when the real-time service is initiated, the service type used to characterize the real-time service is determined.

In the embodiments of the present disclosure, when the terminal initiates a real-time service, it needs to first indicate its service type to the first AP; after receiving the service type sent by the terminal, the first AP will determine that the channel needs to be configured for the real-time service initiated by the terminal, and detect whether there is a second AP that needs channel coordination among the neighboring APs around.

For example, when the terminal initiates a real-time game service, it needs to first indicate its game service type to the first AP; after receiving the game service type sent by the terminal, the first AP will determine that the channel needs to be configured for the real-time game service initiated by the terminal, and detect whether there is a second AP that needs channel coordination among the neighboring APs around.

In step 1120, the service type is sent to the first AP, so that the first AP determines that a channel needs to be configured for the real-time service initiated by the terminal according to the service type, and detects a second AP that requires channel coordination.

It can be seen from the above embodiment that when a real-time service is initiated, the service type used to characterize the real-time service is determined, and the service type is sent to the first AP, so that the first AP can determine that the channel needs to be configured for the real-time service initiated by the terminal according to the service type, and detect the second AP that requires channel coordination, thereby better supporting the real-time service initiated by the terminal, and also improving the practicality of channel coordination.

Corresponding to the above embodiments of the channel coordination method, the present disclosure also provides embodiments of the channel coordination apparatus.

Figure 12:
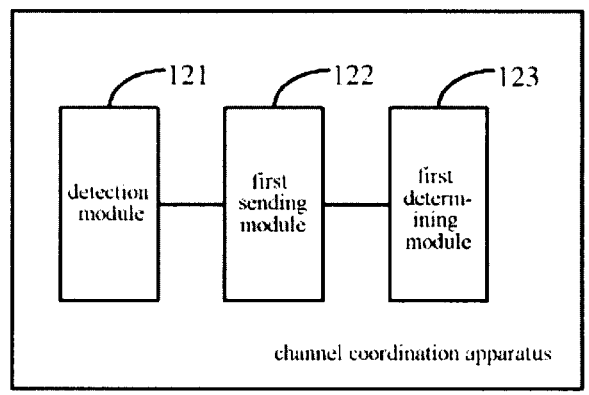
FIG. 12 is a block diagram showing a channel coordination apparatus according to an exemplary embodiment.

FIG. 12 is a block diagram showing a channel coordination apparatus according to an exemplary embodiment. The apparatus may be used for a first AP and configured to perform the channel coordination method shown in FIG. 1. The first AP is an AP currently serving a terminal. As shown in FIG. 12, the channel coordination apparatus may include:

a detection module 121, configured to detect a second AP that requires channel coordination when determining that a channel needs to be configured for a real-time service initiated by the terminal;

a first sending module 122, configured to send a channel coordination request signaling to the second AP, wherein the channel coordination request signaling includes a designated channel that the first AP requests to coordinate; and a first determining module 123, configured to: when receiving a first channel coordination feedback signaling sent from the second AP for indicating to agree to coordinate the designated channel, determine that the second AP agrees to coordinate the designated channel according to the first channel coordination feedback signaling.

It can be seen from the above embodiment that, when it is detected the second AP that requires channel coordination, the channel coordination request signaling may be sent to the second AP, and the channel coordination request signaling includes the designated channel that the first AP requests to coordinate. When the first channel coordination feedback signaling sent from the second AP for indicating to agree to coordinate the designated channel is received, it is determined that the second AP agrees to coordinate the designated channel according to the first channel coordination feedback signaling, which facilitates that the first AP performs configuration for the terminal according to a channel that has been coordinated with a second AP, thereby reducing interference of the wireless network through channel coordination between different APs, and also improving the stability of the channel configured for the terminal.

Figure 13:
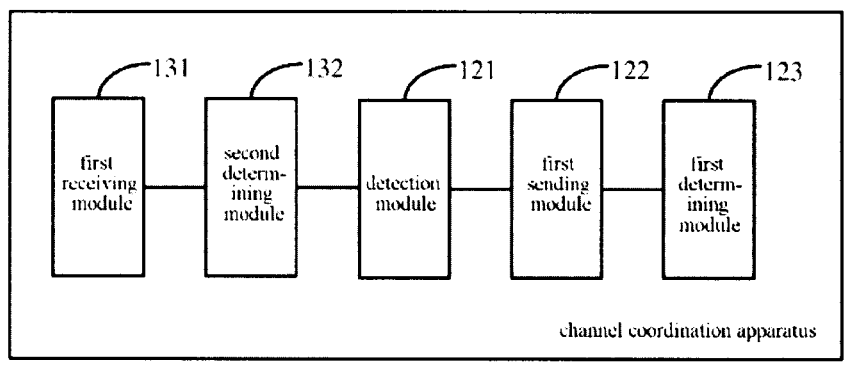
FIG. 13 is a block diagram showing another channel coordination apparatus according to an exemplary embodiment.

In an embodiment, based on the apparatus shown in FIG. 12, as shown in FIG. 13, the channel coordination apparatus may further include:

a first receiving module 131, configured to receive a service type sent by the terminal, wherein the service type is used to characterize the real-time service initiated by the terminal; and a second determining module 132, configured to determine that a channel needs to be configured for a real-time service initiated by the terminal according to the service type.

It can be seen from the above embodiment that when the service type sent by the terminal is received, wherein the service type is used to characterize the real-time service initiated by the terminal, it can be determined that a channel needs to be configured for a real-time service initiated by the terminal according to the service type sent by the terminal and the second AP that requires channel coordination is detected, thereby better supporting the real-time service initiated by the terminal, and also improving the practicality of channel coordination.

Figure 14:
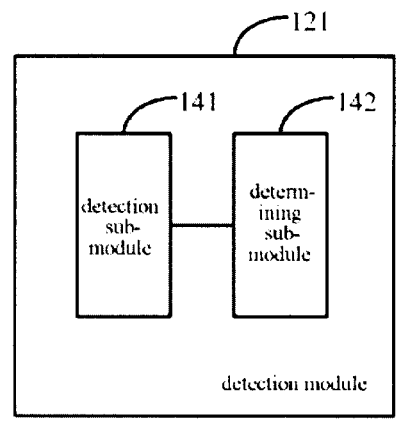
FIG. 14 is a block diagram showing another channel coordination apparatus according to an exemplary embodiment.

In an embodiment, based on the apparatus shown in FIG. 12, as shown in FIG. 14, the detection module 121 may include:

a detection sub-module 141, configured to detect signal quality of each neighboring base station around; and a determining sub-module 142, configured to determine the neighboring base station with signal quality greater than a preset signal quality threshold as the second AP.

It can be seen from the above embodiment that by detecting the signal quality of each neighboring AP around, the neighboring AP with signal quality greater than the preset signal quality threshold is determined as the second AP, thereby improving the reliability of determining the second AP.

In an embodiment, based on the apparatus shown in FIG. 12, the designated channel includes a channel that the first AP intends to operate.

It can be seen from the above embodiment that the designated channel that the first AP requests to coordinate may be the channel that the first AP intends to operate, thereby realizing the coordination for the channel that the first AP intends to operate, enriching the content of channel coordination, and further improving channel coordination efficiency.

In an embodiment, based on the apparatus shown in FIG. 12, the designated channel includes a channel that the first AP does not intend to operate.

It can be seen from the above embodiment that the designated channel that the first AP requests to coordinate may be the channel that the first AP does not intend to operate, thereby realizing the coordination for the channel that the first AP does not intend to operate, enriching the content of channel coordination, and further improving channel coordination efficiency.

In an embodiment, based on the apparatus shown in FIG. 12, the channel coordination request signaling further includes the service type that the first AP needs to support, and the service type is used to characterize the real-time service initiated by the terminal.

It can be seen from the above embodiment that the channel coordination request signaling sent by the first AP further includes the service type that the first AP needs to support, and the service type is used to characterize the real-time service initiated by the terminal, so that the second AP can timely determine the service type that the first AP needs to support, and can determine whether to agree to coordinate the designated channel that the first AP requests to coordinate according to the service type, thereby improving the accuracy of the channel coordination.

Figure 15:
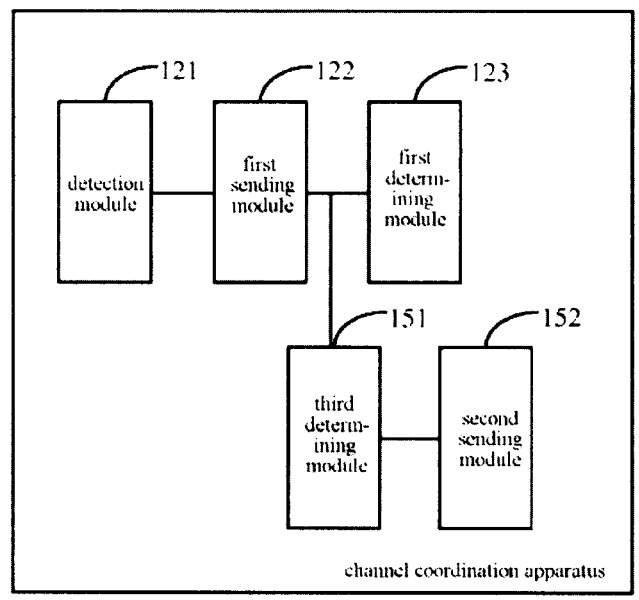
FIG. 15 is a block diagram showing another channel coordination apparatus according to an exemplary embodiment.

In an embodiment, based on the apparatus shown in FIG. 12, as shown in FIG. 15, the channel coordination apparatus may further include:

a third determining module 151, configured to, when receiving a second channel coordination feedback signaling sent from the second AP for indicating to disagree to coordinate the designated channel, determine, according to the second channel coordination feedback signaling, that the second AP disagrees to coordinate the designated channel; and a second sending module 152, configured to send another channel coordination request signaling to the second AP, wherein the another channel coordination request signaling includes another designated channel that the first AP requests to coordinate.

It can be seen from the above embodiment that when a second channel coordination feedback signaling is received sent from the second AP for indicating to disagree to coordinate the designated channel, it is determined that the second AP disagrees to coordinate the designated channel according to the second channel coordination feedback signaling. Further, the first AP may continue to send another channel coordination request signaling to the second AP, and the another channel coordination request signaling includes another designated channel that the first AP requests to coordinate, thereby reducing the wireless network interference through multiple channel coordination of different APs.

Figure 16:
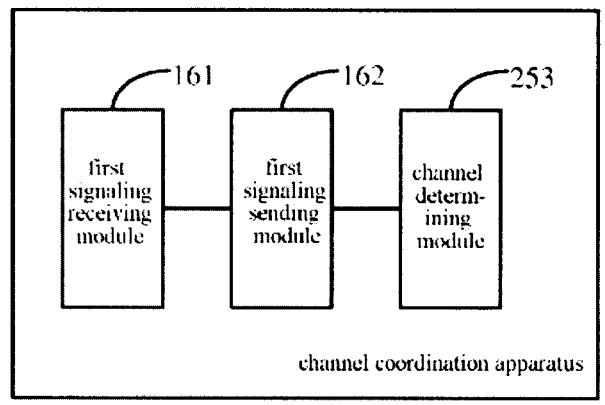
FIG. 16 is a flowchart showing a channel coordination apparatus according to an exemplary embodiment.

FIG. 16 is a block diagram showing a channel coordination apparatus according to an exemplary embodiment. The apparatus may be used for the second AP and configured to perform the channel coordination method shown in FIG. 6. The first AP is an AP currently serving a terminal, and the second AP is an AP detected by the first AP and requiring the channel coordination. As shown in FIG. 16, the channel coordination apparatus may include:

a first signaling receiving module 161, configured to receive a channel coordination request signaling sent by the first AP, wherein the channel coordination request signaling includes a designated channel that the first AP requests to coordinate;

a first signaling sending module 162, configured to, when determining to agree to coordinate the designated channel, send a first channel coordination feedback signaling for indicating to agree to coordinate the designated channel to the first AP; and a channel determining module 163, configured to determine a channel for local service transmission according to the designated channel.

It can be seen from the above embodiment that by receiving the channel coordination request signaling including a designated channel that the first AP requests to coordinate sent by the first AP, the first channel coordination feedback signaling for indicating to agree to coordinate the designated channel is sent to the first AP, when determining to agree to coordinate the designated channel; and a channel for local service transmission is determined according to the designated channel, thereby reducing interference of the wireless network through channel coordination between different APs, and also avoiding conflict with the channel configured by the first AP for the terminal, so that the first AP can better provide the wireless service for the terminal.

Figure 17:
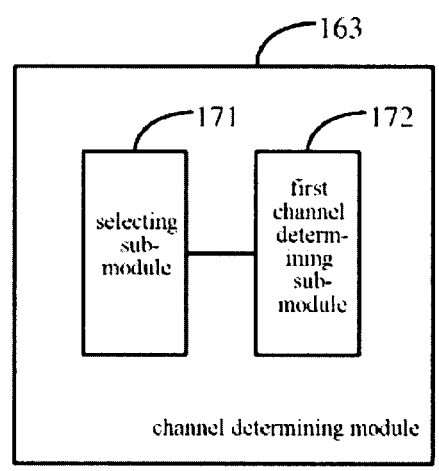
FIG. 17 is a block diagram showing another channel coordination apparatus according to an exemplary embodiment.

In an embodiment, based on the apparatus shown in FIG. 16, the designated channel includes a channel that the first AP intends to operate; as shown in FIG. 17, the channel determining module 163 may include:

a selecting sub-module 171, configured to select a channel other than the channel that the first AP intends to operate; and a first channel determining sub-module 172, configured to determine the selected channel as the channel for the local service transmission.

It can be seen from the above embodiment that when the designated channel that the first AP requests to coordinate is the channel that the first AP intends to operate, a channel other than the channel that the first AP intends to operate is selected, and the selected channel is determined as the channel for the local service transmission, thereby avoiding the collision of the channel that the first AP intends to operate, and reducing the network interference between different Aps.

Figure 18:
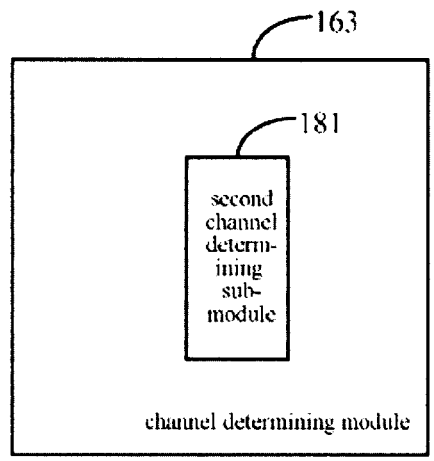
FIG. 18 is a block diagram showing another channel coordination apparatus according to an exemplary embodiment.

In an embodiment, based on the apparatus shown in FIG. 16, the designated channel includes a channel that the first AP does not intend to operate; as shown in FIG. 18, the channel determining module 163 may include:

a second channel determining sub-module 181, configured to determine the channel that the first AP does not intend to operate as the channel for the local service transmission.

It can be seen from the above embodiment that when the designated channel that the first AP requests to coordinate is the channel that the first AP does not intend to operate, the channel that the first AP does not intend to operate is determined as the channel for the local service transmission, thereby avoiding the collision of the channel that the first AP intends to operate, and reducing the network interference between different APs.

Figure 19:
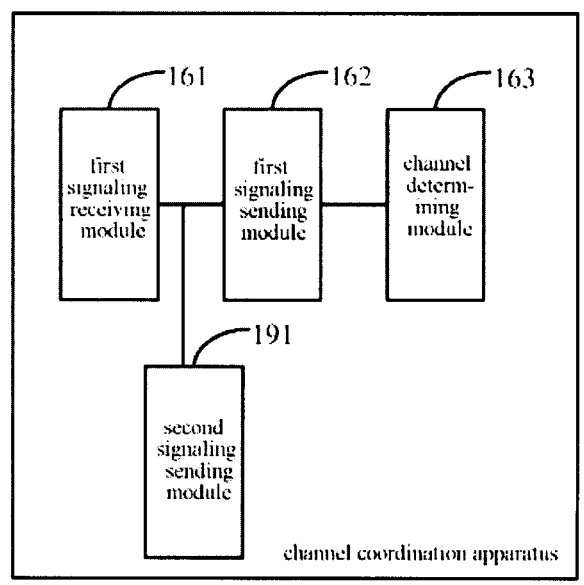
FIG. 19 is a block diagram showing another channel coordination apparatus according to an exemplary embodiment.

In an embodiment, based on the apparatus shown in FIG. 16, as shown in FIG. 19, the channel coordination apparatus may further include:

a second signaling sending module 191, configured to, when determining to disagree to coordinate the designated channel, send a second channel coordination feedback signaling for indicating to disagree to coordinate the designated channel to the first AP.

It can be seen from the above embodiment that when it is determined to disagree to coordinate the designated channel, the second channel coordination feedback signaling for indicating to disagree to coordinate the designated channel can be sent to the first AP, thereby satisfying the autonomous choice for channel coordination of the second AP, and improving the channel coordination efficiency.

Figure 20:
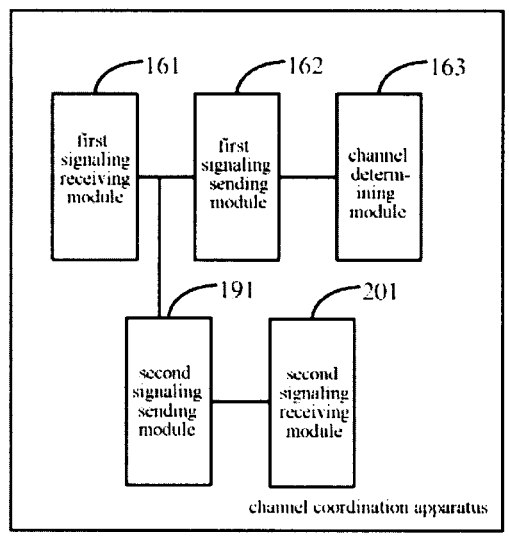
FIG. 20 is a block diagram showing another channel coordination apparatus according to an exemplary embodiment.

In an embodiment, based on the apparatus shown in FIG. 19, as shown in FIG. 20, the channel coordination apparatus may further include:

a second signaling receiving module 201, configured to receive another channel coordination request signaling sent by the first AP, wherein the another channel coordination request signaling includes another designated channel that the first AP requests to coordinate.

It can be seen from the above embodiment that by receiving another channel coordination request signaling sent by the first AP, which includes another designated channel that the first AP requests to coordinate, it achieves to reducing wireless network interference through multiple channel coordination of different APs.

Figure 21:
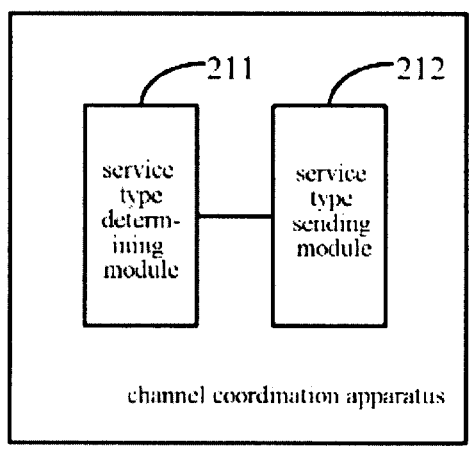
FIG. 21 is a block diagram showing a channel coordination apparatus according to an exemplary embodiment.

FIG. 21 is a block diagram showing a channel coordination apparatus according to an exemplary embodiment. The apparatus may be used for a terminal and configured to perform the channel coordination method shown in FIG. 11, and the first AP is an AP currently serving the terminal. As shown in FIG. 21, the channel coordination apparatus may include:

a service type determining module 211, configured to determine a service type used to characterize the real-time service when initiating a real-time service; and a service type sending module 212, configured to send the service type to the first AP, so that the first AP determines that a channel needs to be configured for the real-time service initiated by the terminal according to the service type, and detects a second AP that requires channel coordination.

It can be seen from the above embodiment that when a real-time service is initiated, the service type used to characterize the real-time service is determined, and the service type is sent to the first AP, so that the first AP can determine that the channel needs to be configured for the real-time service initiated by the terminal according to the service type, and detect the second AP that requires channel coordination, thereby better supporting the real-time service initiated by the terminal, and also improving the practicality of channel coordination.

As for the apparatus embodiment, since it basically corresponds to the method embodiment, the relevant parts may refer to the description of the method embodiment. The apparatus embodiments described above are only exemplary, in which the units described as separate components may or may not be physically separated, and the components shown as units may or may not be physical units, that is, may be located in one place, or can be distributed across multiple network units. Some or all of the modules can be selected according to actual needs to achieve the objectives of the solution of the present disclosure. Those of ordinary skill in the art can understand and implement the present disclosure without creative efforts.

The present disclosure also provides a non-transitory computer-readable storage medium having a computer program stored thereon, and the computer program is configured to perform the channel coordination method described in any one of FIGS. 1 to 5 described above.

The present disclosure also provides a non-transitory computer-readable storage medium having a computer program stored thereon, and the computer program is configured to perform the channel coordination method described in any one of FIGS. 6 to 10 described above.

The present disclosure also provides a non-transitory computer-readable storage medium on which a computer program is stored, and the computer program is used to perform the channel coordination method described in FIG. 11 described above.

The present disclosure also provides a channel coordination apparatus. The apparatus is used for a first AP, and the first AP is an AP currently serving a terminal. The apparatus includes:
   a processor; and
   a memory for storing executable instructions of the processor;
   wherein the processor is configured to:
   when determining that a channel needs to be configured for a real-time service initiated by the terminal, detect a second AP that requires channel coordination;
   send a channel coordination request signaling to the second AP, wherein the channel coordination request signaling includes a designated channel that the first AP requests to coordinate; and
   when receiving a first channel coordination feedback signaling sent from the second AP for indicating to agree to coordinate the designated channel, determine, according to the first channel coordination feedback signaling, that the second AP agrees to coordinate the designated channel.

Figure 22:
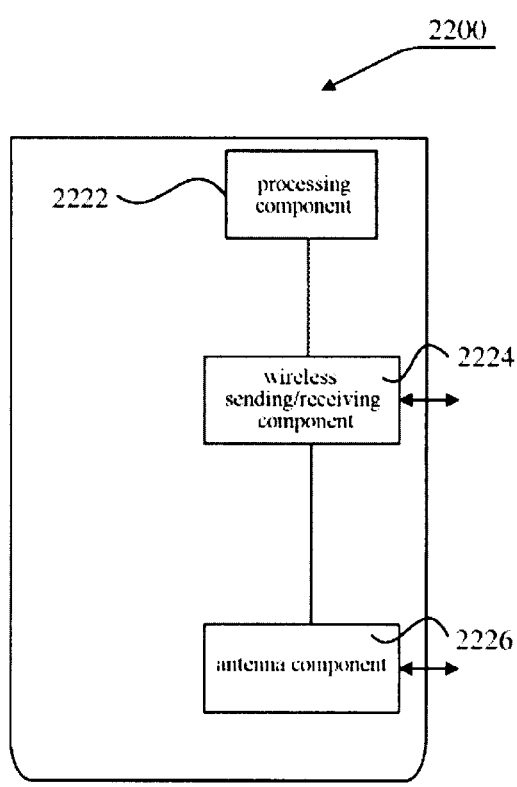
FIG. 22 is a schematic structural diagram showing a channel coordination apparatus according to an exemplary embodiment.

As shown in FIG. 22, FIG. 22 is a schematic structural diagram showing a channel coordination apparatus according to an exemplary embodiment. The apparatus 2200 may be provided as the first AP. Referring to FIG. 22, the apparatus 2200 includes a processing component 2222, a wireless sending/receiving component 2224, an antenna component 2226, and a signal processing part specific to the wireless interface. The processing component 2222 may further include one or more processors.

One of the processors in the processing component 2222 can be configured to perform any of the channel coordination methods described above.

The present disclosure also provides a channel coordination apparatus, which is used for a second AP, a first AP is an AP currently serving a terminal, and the second AP is an AP detected by the first AP and requiring the channel coordination. The apparatus includes:
   a processor; and
   a memory for storing executable instructions of the processor;
   wherein the processor is configured to:
   receive a channel coordination request signaling sent by the first AP, wherein the channel coordination request signaling includes a designated channel that the first AP requests to coordinate;
   when determining to agree to coordinate the designated channel, send a first channel coordination feedback signaling for indicating to agree to coordinate the designated channel to the first AP; and
   determine a channel for local service transmission according to the designated channel.

Figure 23:
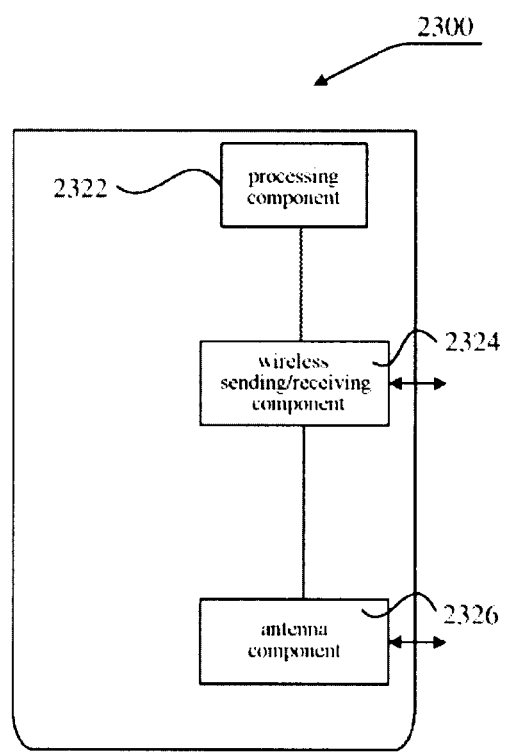
FIG. 23 is a schematic structural diagram showing a channel coordination apparatus according to an exemplary embodiment.

As shown in FIG. 23, FIG. 23 is a schematic structural diagram showing a channel coordination apparatus according to an exemplary embodiment. The apparatus 2300 may be provided as the second AP. Referring to FIG. 23, the apparatus 2300 includes a processing component 2322, a wireless sending/receiving component 2324, an antenna component 2326, and a signal processing part specific to the wireless interface. The processing component 2322 may further include one or more processors.

One of the processors in the processing component 2322 can be configured to perform any of the channel coordination methods described above.

The present disclosure also provides a channel coordination apparatus. The apparatus is used for a terminal and the first AP is an AP currently serving the terminal. The apparatus includes:
   a processor; and
   a memory for storing executable instructions of the processor;
   wherein the processor is configured to:
   when initiating a real-time service, determine a service type used to characterize the real-time service; and
   send the service type to the first AP, so that the first AP determines that a channel needs to be configured for the real-time service initiated by the terminal according to the service type, and detects a second AP that requires channel coordination.

The technical solutions provided by the embodiments of the present disclosure may include the following beneficial effects.

When detecting the second AP that requires channel coordination, the first AP in the present disclosure can send the channel coordination request signaling to the second AP, and the channel coordination request signaling includes the designated channel that the first AP requests to coordinate. When receiving the first channel coordination feedback signaling sent from the second AP for indicating to agree to coordinate the designated channel, the first AP in the present disclosure determines that the second AP agrees to coordinate the designated channel according to the first channel coordination feedback signaling, which facilitates that the first AP performs configuration for the terminal according to a channel that has been coordinated with a second AP, thereby reducing interference of the wireless network through channel coordination between different APs, and also improving the stability of the channel configured for the terminal.

By receiving the channel coordination request signaling sent by the first AP, which includes a designated channel that the first AP requests to coordinate, the second AP in the present disclosure may send the first channel coordination feedback signaling, which is used for indicating to agree to coordinate the designated channel to the first AP when determining to agree to coordinate the designated channel; and the second AP in the present disclosure may determine a channel for local service transmission according to the designated channel, thereby reducing interference of the wireless network through channel coordination between different APs, and also avoiding conflict with the channel configured by the first AP for the terminal, so that the first AP can better provide the wireless service for the terminal.

When initiating the real-time service, the terminal in the present disclosure can first determine the service type used to characterize the real-time service and send the service type to the first AP, so that the first AP can determine that the channel needs to be configured for the real-time service initiated by the terminal according to the service type, and detect the second AP that requires channel coordination, thereby better supporting the real-time service initiated by the terminal, and also improving the practicality of channel coordination.

Figure 24:
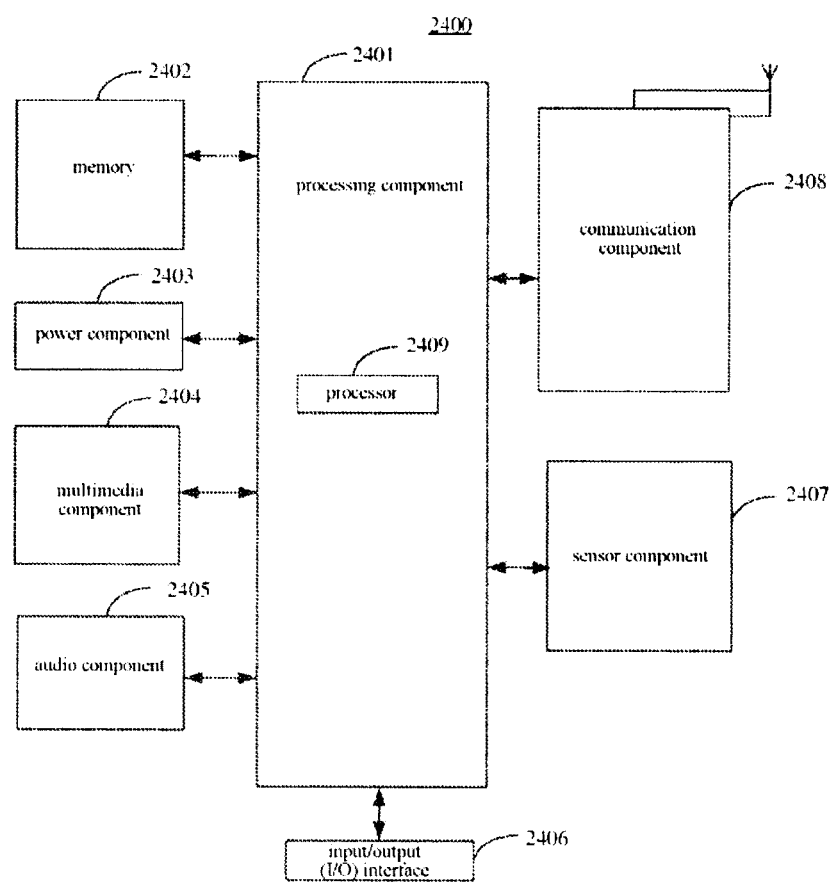
FIG. 24 is a schematic structural diagram showing a channel coordination apparatus according to an exemplary embodiment.

FIG. 24 is a schematic structural diagram showing a channel coordination apparatus according to an exemplary embodiment. As shown in FIG. 24, a channel coordination apparatus 2400 is shown according to an exemplary embodiment. The apparatus 2400 may be a computer, a mobile phone, a digital broadcasting terminal, a messaging apparatus, a game console, a tablet apparatus, a medical apparatus, a fitness device, a personal digital assistant and other terminals.

Referring to FIG. 24, the apparatus 2400 may include one or more of the following components: a processing component 2401, a memory 2402, a power component 2403, a multimedia component 2404, an audio component 2405, an input/output (I/O) interface 2406, a sensor component 2407, and a communication component 2408.

The processing component 2401 typically controls the overall operations of the apparatus 2400, such as the operations associated with display, telephone calls, data communications, camera operations, and recording operations. The processing component 2401 can include one or more processors 2409 to execute instructions to perform all or part of the steps in the above described methods. Moreover, the processing component 2401 can include one or more modules to facilitate the interaction between the processing component 2401 and other components. For example, the processing component 2401 can include a multimedia module to facilitate the interaction between the multimedia component 2404 and the processing component 2401.

The memory 2402 is configured to store various types of data to support the operation of the apparatus 2400. Examples of such data include instructions for any application or method operated on apparatus 2400, such as the contact data, the phone book data, messages, pictures, videos, and the like. The memory 2402 can be implemented by any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2403 provides power to various components of the apparatus 2400. The power component 2403 can include a power management system, one or more power sources, and other components associated with the generation, management, and distribution of power in the apparatus 2400.

The multimedia component 2404 includes a screen providing an output interface between the apparatus 2400 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2404 includes a front camera and/or a rear camera. When the apparatus 2400 is in an operation mode, such as a photographing mode or a video mode, the front camera and/or the rear camera can receive external multimedia datum. Each of the front camera and the rear camera may be a fixed optical lens system or have focus and optical zoom capability.

The audio component 2405 is configured to output and/or input an audio signal. For example, the audio component 2405 includes a microphone (MIC) configured to receive an external audio signal when the apparatus 2400 is in an operation mode, such as a call mode, a recording mode, and a voice recognition mode. The received audio signal may be further stored in the memory 2402 or sent via the communication component 2408. In some embodiments, the audio component 2405 also includes a speaker for outputting the audio signal.

The I/O interface 2406 provides an interface between the processing component 2401 and peripheral interface modules, such as a keyboard, a click wheel, buttons, and the like. These buttons may include, but not limited to, a home button, a volume button, a starting button, and a locking button.

The sensor component 2407 includes one or more sensors for providing status assessments of various aspects of the apparatus 2400. For example, the sensor component 2407 can detect an open/closed status of the apparatus 2400, relative positioning of components, such as the display and the keypad of the apparatus 2400. The sensor component 2407 can also detect a change in position of one component of the apparatus 2400 or the apparatus 2400, the presence or absence of user contact with the apparatus 2400, an orientation, or an acceleration/deceleration of the apparatus 2400, and a change in temperature of the apparatus 2400. The sensor component 2407 can include a proximity sensor configured to detect the presence of nearby objects without any physical contact. The sensor component 2407 can also include a light sensor, such as a CMOS or CCD image sensor, configured to use in imaging applications. In some embodiments, the sensor component 2407 can also include an accelerometer sensor, a gyroscope sensor, a magnetic sensor, a pressure sensor, or a temperature sensor.

The communication component 2408 is configured to facilitate wired or wireless communication between the apparatus 2400 and other devices. The apparatus 2400 can access a wireless network based on a communication standard, such as WiFi, 2G or 3G, or a combination thereof. In an exemplary embodiment, the communication component 2408 receives broadcast signals or broadcast associated information from an external broadcast management system via a broadcast channel. In an exemplary embodiment, the communication component 2408 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 2400 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the above methods.

In an exemplary embodiment, there is also provided a non-transitory computer-readable storage medium including instructions, such as a memory 2402 including instructions executable by the processor 2409 of the apparatus 2400 to perform the above described method. For example, the non-transitory computer readable storage medium may be a ROM, a random access memory (RAM), a CD-ROM, a magnetic tape, a floppy disc, and an optical data storage apparatus.

When the instructions in the storage medium are executed by the processor, the apparatus 3400 can perform any of the channel coordination methods described above.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are merely illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A channel coordination method, comprising:
in response to determining that a channel needs to be configured for a real-time service initiated by a terminal, detecting, by a first access point AP currently serving the terminal, signal quality of each neighboring AP;
determining a neighboring AP with signal quality greater than a preset signal quality threshold as a second AP that interferences with the first AP and requires channel coordination;
sending, by the first access point AP, a channel coordination request signaling to the second AP, wherein the channel coordination request signaling comprises a designated channel that the first AP requests to coordinate, and the designated channel comprises a channel that the first AP does not intend to operate;
in response to receiving a first channel coordination feedback signaling sent from the second AP for indicating to agree to coordinate the designated channel, determining, by the first access point AP, that the second AP agrees to coordinate the designated channel according to the first channel coordination feedback signaling; and in response to receiving a second channel coordination feedback signaling sent from the second AP for indicating to disagree to coordinate the designated channel, determining that the second AP disagrees to coordinate the designated channel according to the second channel coordination feedback signaling; and sending another channel coordination request signaling to the second AP, wherein the another channel coordination request signaling comprises another designated channel that the first AP requests to coordinate;
wherein a threshold for a number of times of channel coordination is preset, and in response to the number of times of the channel coordination exceeds the threshold, the channel coordination stops.

2. The method according to claim 1, further comprising:
receiving, by the first access point AP, a service type sent by the terminal, wherein the service type is used to characterize the real-time service initiated by the terminal; and
determining, by the first access point AP, that the channel needs to be configured for the real-time service initiated by the terminal according to the service type.

3. The method according to claim 1, wherein the channel coordination request signaling further comprises the service type that the first AP needs to support, and the service type is used to characterize the real-time service initiated by the terminal.

4. A channel coordination apparatus, wherein the apparatus is used for a first AP, the first AP is an AP currently serving a terminal, and the apparatus comprises:
a processor; and
a memory for storing executable instructions of the processor,
wherein the processor is configured to perform the method according to claim 1.

5. A non-transitory computer-readable storage medium having a computer program stored thereon, wherein the computer program is used to perform the channel coordination method according to claim 1.

6. A channel coordination method comprising:
receiving a channel coordination request signaling sent by a first AP, wherein the channel coordination request signaling comprises a designated channel that the first AP requests to coordinate, and the designated channel comprises a channel that the first AP does not intend to operate, wherein the first AP is an AP currently serving a terminal, and the second AP is a neighboring AP with signal quality greater than a preset signal quality threshold detected by the first AP and determined by the first AP as an AP that interferences with the first AP and requires channel coordination;
in response to determining to agree to coordinate the designated channel, sending a first channel coordination feedback signaling for indicating to agree to coordinate the designated channel to the first AP;
determining a channel for local service transmission according to the designated channel; and
in response to determining to disagree to coordinate the designated channel, sending a second channel coordination feedback signaling for indicating to disagree to coordinate the designated channel to the first AP; and receiving another channel coordination request signaling sent by the first AP, wherein the another channel coordination request signaling comprises another designated channel that the first AP requests to coordinate;
wherein a threshold for a number of times of channel coordination is preset, and in response to the number of times of the channel coordination exceeds the threshold, the channel coordination stops.

7. The method according to claim 6, wherein the designated channel comprises a channel that the first AP does not intend to operate;
   determining a channel for local service transmission according to the designated channel comprises:
   determining the channel that the first AP does not intend to operate as the channel for the local service transmission.

8. A channel coordination apparatus, wherein the apparatus is used for a second AP, the first AP is an AP currently serving a terminal, and the second AP is an AP detected by the first AP and requiring the channel coordination, the apparatus comprises:
   a processor; and
   a memory for storing executable instructions of the processor,
   wherein the processor is configured perform the method according to claim 6.

9. A non-transitory computer-readable storage medium having a computer program stored thereon, wherein the computer program is used to perform the channel coordination method according to claim 6.

* * * * *